Patented Oct. 27, 1970

3,536,720
2,2,6,6-TETRASUBSTITUTED-4-SUBSTITUTED-METHYLENE PIPERIDINE-1-OXIDES
Keisuke Murayama, Syoji Morimura, and Eiko Yamao, Tokyo, Japan, assignors to Sankyo Company Limited, Chuo-ku, Tokyo, Japan
No Drawing. Filed July 12, 1967, Ser. No. 652,702
Claims priority, application Japan, Aug. 16, 1966, 41/53,435; Oct. 5, 1967, 42/65,522
Int. Cl. C07d 29/32
U.S. Cl. 260—293       8 Claims

ABSTRACT OF THE DISCLOSURE

Novel 2,2,6,6-tetrasubstituted-4-substitutedmethylene piperidine-1-oxides which are useful as stabilizers for polyolefin against deterioration resulting from exposure to light. These novel piperidine-1-oxides can be prepared by reacting 2,2,6,6-tetrasubstituted-4-oxopiperidine-1-oxides with reactive methylene derivatives in the presence of a basic condensing agent by reacting 2,2,6,6-tetrasubstituted-4-oxopiperidine with reactive methylene derivatives in the presence of a basic condensing agent to form 2,2,6,6-tetrasubstituted-4-substituted methylene-piperidines followed by treatment of the latter products thus obtained with a peroxide.

---

This invention relates to a novel class of piperidine-N-oxides and also to a process for preparing the same.

More particularly, it relates to the piperidine-N-oxides having the formula

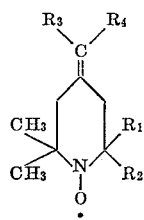

(I)

wherein $R_1$ and $R_2$, which may be the same or different, are alkyl group, and $R_3$ and $R_4$, which may be the same or different, are cyano group, carboxyl group, alkoxycarbonyl group, carbamoyl group, aliphatic or aromatic acyl group or aryl group.

Also, it relates to a process for the preparation of the piperidine-N-oxide having the above Formula I.

The piperidine-N-oxides (I) of this invention are novel compounds unknown in the prior art. They exhibit an exceptionally high degree of stabilizing effect against photo-deterioration of polyolefins including, for example, polyethylene, polypropylene, other polyolefins such as polybutadiene and various olefin copolymers such as ethylene-propylene copolymers, styrene-butadiene copolymers and acrylonitrile-butadiene-styrene copolymers. Thus, these novel piperidine-N-oxides (I) of this invention are useful as light stabilizers for various polyolefins.

It is a principal object of this invention to provide a new class of the piperidine-N-oxides having the above Formula I which are useful as stabilizers for polyolefins against deterioration resulting from exposure to light. Another object of this invention is to provide a novel and commercially available process for the preparation of the aforementioned piperidine-N-oxides having the Formula I. These and other objects and advantages of this invention will be more apparent from the detailed description which follows.

In the above Formula I, each of the groups $R_1$ and $R_2$ may illustratively be methyl, ethyl, n-propyl, isopropyl, n-butyl, isobutyl, octyl and the like. Each of the groups $R_3$ and $R_4$ may illustratively be cyano, carboxyl, methoxycarbonyl, ethoxycarbonyl, n-propoxycarbonyl, carbamoyl, acetyl, propionyl, butyryl, benzoyl, naphthoyl, phenyl, naphthyl and the like.

In accordance with this invention, there is provided a new process for the preparation of the piperidine-N-oxides having the above Formula I. More specifically, there are involved two specific embodiments for the preparation of the piperidine-N-oxides having the above Formula I; namely, one specific embodiment for preparing the piperidine-N-oxides having the above Formula I wherein $R_1$, $R_2$, $R_3$ and $R_4$ are as defined above (hereinafter frequently referred to as Process A) and another specific embodiment for preparing the piperidine-N-oxides having the above Formula I wherein $R_1$ and $R_2$ are as defined above and $R_3$ and $R_4$ each represents the above-defined group other than cyano group (hereinafter frequently referred to as Process B); the latter piperidine-N-oxides being represented by the following formula

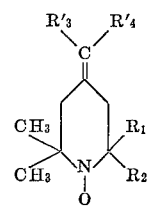

(I-a)

wherein $R_1$ and $R_2$ are as defined above and $R_3'$ and $R_4'$, which may be the same or different, are carboxyl group, alkoxycarbonyl group, carbamoyl group, aliphatic or aromatic acyl group or aryl group. These specific embodiments in the present process will be more fully discussed hereinbelow.

PROCESS A

In one embodiment of the process according to this invention, the piperidine-N-oxide of the above Formula I can be prepared by a novel process which comprises reacting the piperidone-N-oxides having the formula

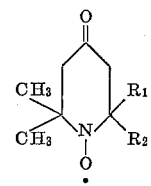

(II)

wherein $R_1$ and $R_2$ are as defined above with the reactive methylene derivative having the formula

$$R_3\text{—}CH_2\text{—}R_4 \qquad (III)$$

wherein $R_3$ and $R_4$ are as defined above in the presence of a basic condensing agent.

As a basic condensing agent in this embodiment, there may be satisfactorily employed any of various basic catalysts commonly utilized for condensation reaction (with dehydration) of a ketone or aldehyde compound. Illustrative examples of the basic catalyst which may be conveniently employed as a basic condensing agent in this embodiment include hydroxides and carbonates of alkali metals; hydroxides of alkaline earth metals; alkali metal alcoholates; alkali metal amides; alkali metal hydrides; and the like. Preferred examples of the basic catalyst are potassium and sodium and calcium hydroxides; potassium and sodium carbonates; potassium methoxide, sodium ethoxide and potassium tert.-butoxide; sodium and potassium amides; sodium hydride; and the like.

In the process of this embodiment, the reaction may be preferably conducted in a suitable reaction solvent. The type of the reaction solvent to be employed may be advantageously selected and determined by those skilled in the art, mainly based upon the basic condensing agent employed. For instance, there may be employed water, aqueous alcohols and alcohols for hydroxides and carbonates of alkali metals; absolute alcohols and benzene for alkali metal alcoholates; and benzene and toluene for alkali metal hydrides.

The reaction period and temperature are not critical, and may be generally varied depending upon the reactivity of the reactive methylene derivative (III) employed. For instance, where the reactivity is higher, the reaction may be usually conducted with ice-cooling for a short period of time. Where the reactivity is relatively lower, the reaction may be usually conducted at ambient temperature for several days or it may be conducted with ice-cooling or at ambient temperature for a while and then with heating to about 60–120° C. for about 5 minutes to 8 hours.

After completion of the reaction, the desired product, i.e. the piperidine-N-oxide of the Formula I may be recovered from the reaction mixture by any conventional technique, for example, neutralization, extraction, distillation and the like.

The piperidone-N-oxides of the Formula II which are employed as a starting material in this embodiment are novel compounds but 2,2,6,6-tetramethyl-4-oxopiperidine-1-oxide, and these novel starting compounds can be advantageously prepared by reacting diacetone alcohol with the corresponding ketone in the presence of ammonia and a Lewis acid to form the corresponding piperidone and treating the latter product thus formed with hydrogen peroxide or an organic peracid, as illustrated by the following reaction schema.

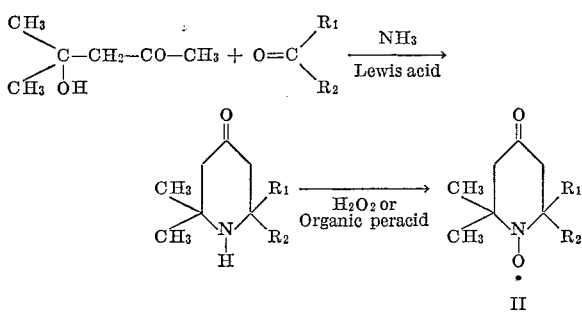

Process B

In another specific embodiment of the process according to this invention, the piperidine-N-oxide of the above Formula I–a can be prepared by a novel process which involves two steps, i.e. the first step which comprises reacting the piperidone derivative having the formula

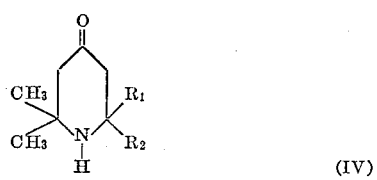

wherein $R_1$ and $R_2$ are as defined above with the reactive methylene derivative having the above Formula III in the presence of a basic condensing agent to form the piperidine derivative having the formula

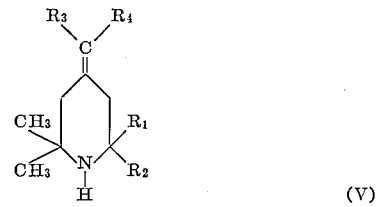

wherein $R_1$, $R_2$, $R_3$ and $R_4$ are as defined above and the second step which comprises treating the latter product (V) obtained in the first step with a peroxide, thereby to form the desired piperidine-N-oxide (I–a).

In carrying out the Process B, the first step may be conveniently conducted in the same fashion as the above-depicted Process A. Those procedures, reagents, basic condensing agents, reaction period and temperature, recovery of the final product and the like as fully disclosed in the above Process A may be correspondingly and conveniently utilized in this step.

The second step in this Process B may be satisfactorily conducted by treating the piperidine derivative (V) obtained in the aforesaid first step with a suitable peroxide. Suitable examples of the peroxide to be employed in this process include hydrogen peroxide, an organic peracid and the like. Suitable examples of the organic peracid are peracetic acid, perbenzoic acid, substituted-perbenzoic acids and the like.

Where hydrogen peroxide is employed as an oxidizing agent in this process, it is preferable to conduct oxidation reaction in the presence of a catalyst for oxidation, more preferably together with promoter, since the increased yield of the desired product may be obtained. There may be satisfactorily employed any of those catalysts for oxidation and promoters commonly utilized in the art for oxidation, but alkali metal salts of such inorganic acid as tungstic, phosphotungstic and phosphomolybdic acids and vanadium oxide are preferable as a catalyst and ethylenediaminetetraacetic acid as a promoter. In this case, the reaction of this process may also be conducted in the presence of a suitable reaction solvent such as water and suitable organic solvents, e.g. methanol, acetic acid, and the like. The reaction temperature and period are not critical, but the reaction is usually conducted at ordinary temperature, and preferably at a higher temperature ranging from about 20° C. to about 50° C. for about 10–30 hours.

Where an organic peracid is employed as an oxidizing agent, the reaction may be conveniently conducted at ordinary temperature, but it may be more preferable to employ any external cooling means to about 0–10° C. during the addition of an organic peracid, since, in this case, the reaction may initially be exothermic. The reaction may also be preferably conducted in the presence of a suitable reaction solvent; for instance, preferable being water, acetic acid, ethyl acetate, methylene chloride and the like for peracetic acid and ether, benzene, chloroform and the like for perbenzoic acid and substituted-perbenzoic acids.

The desired product, i.e., the piperidine-N-oxide of the above Formula I–a may be preferably recovered from the reaction mixture, for instance, by admixing either the crystalline substance collected by filtration, if separated out in situ, or the reaction mixture, if not, with a saturated aqueous solution of a suitable alkali such as hydroxides and carbonates of sodium, potassium, calcium and barium and the like at ordinary temperature for about 1–3 hours, extracting the resulting mixture with a suitable organic solvent such as benzene, ether, methyl ethyl ketone and the like and then removing the solvent by distillation. The crude product thus obtained may be further purified, for instance, by recrystallization from a suitable organic solvent such as methanol, benzene, methyl ethyl ketone and the like, if desired.

The piperidones of the above Formula IV which are employed as a starting material in this Process B are novel compounds but 2,2,6,6-tetramethyl-4-oxopiperidine, and these novel starting compounds can be advantageously prepared by reacting diacetone alcohol with the corresponding ketone in the presence of ammonia and a Lewis acid, as illustrated by the following reaction schema.

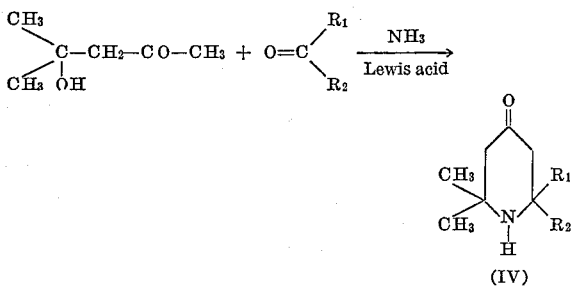

The following examples are given for the purpose of illustrating this invention, but they should not be construed to be limiting the scope thereof.

The Examples 1 through 4 illustratively describe the Process A and those Examples 5 through 7 illustratively describe the Process B.

EXAMPLE 1

Preparation of 2,2,6,6-tetramethyl-4-(α-cyanobenzylidine)piperidine-1-oxide

To a solution of 2.4 g. of metallic potassium in 50 ml. of tert.-butanol was added 10 g. of benzyl cyanide and to the resulting mixture was added 7 g. of 2,2,6,6-tetramethyl-4-oxopiperidine-1-oxide with ice-cooling and stirring. The mixture thus obtained was stirred with ice-cooling for 20 minutes and then heated to 80° C. for additional 10 minutes. Immediately after the heating, the reaction mixture was ice-cooled. The solvent was distilled off from the reaction mixture, the residue was admixed with 20 ml. of iced wated and, after neutarilization with 30% aqueous acetic acid, the whole mixture were extracted several times with benzene. The combined extracts were dried over anhydrous potassium carbonate and the solvent was distilled off. The crystaline residue thus obtained was recrystallized from methanol to give the desired product, melting at 131–132° C.

*Analysis.*—Calculated for $C_{17}H_{21}ON_2$ (percent): C, 75.80; H, 7.86; N, 10.40. Found (percent): C, 76.02; H, 7.96; N, 10.59.

EXAMPLE 2

Preparation of 2,2,6,6,-tetramethyl-4-,α,α-dicyanomethylene)piperidine-1-oxide

To a solution of 4 g. of 2,2,6,6-tetramethyl-4-oxopiperidine-1-oxide in 40 ml. of water was added 5 ml. of 10% aqueous potassium carbonate and to the resulting mixture was added dropwise a solution of 1.5 g. of malononitrile in 5 ml. of water with ice-cooling and stirring. After completion of the dropwise addition, the reaction mixture was stirred for 5–6 minutes with ice-cooling. The crystalline substance which precipitated out was recovered by filtration, washed with water and then recrystallized from a mixture of ether and petroleum ether to give the desired product, melting at 99–100° C.

*Analysis.*—Calculated for $C_{12}H_{16}ON_3$ (percent): C, 66.03; H, 7.39; N, 19.25. Found (percent): C, 66.16; H, 7.44; N, 19.20.

EXAMPLE 3

Preparation of 2,2,6,6-tetramethyl-4-(α-cyano-α-ethoxycarbonylmethylene) piperidine-1-oxide To a solution of 10.2 g. of potassium tert.-butoxide in 70 ml. of tert.-butanol was added dropwise at room temperature a solution of 8.5 g. of 2,2,6,6-tetramethyl-4-oxo- piperidine-1-oxide and 12.4 g. of ethyl cyanoacetate in 20 ml. of tert.-butanol under nitrogen stream. After completion of the dropwise addition, the reaction mixture was gently boiled with stirred for 15 minutes, externally ice-cooled and then neutralized by the addition of aqueous hydrochloric acid. The solvent was distilled off under reduced pressure from the reaction mixture, the residue was poured onto cracked ice and, after addition of benzene, the resulting mixture was made acidic to pH 3 by addition of a small amount of aqueous hydrochloride acid. The acidic mixture was extracted several times with benzene.

The combined extracts were washed with water, dried over anhydrous sodium sulfate and then distilled under reduced pressure to give the desired product, boiling at 135–140° C./0.1 mm. Hg.

*Analysis.*—Calculated for $C_{14}H_{21}O_3N_2$ (percent): C, 63.37; H, 7.98; N, 10.56. Found (percent): C, 63.49; H, 8.15; N, 10.31.

EXAMPLE 4

Preparation of 2,2,6-trimethyl-6-isobutyl-4-(α-cyanobenzylidene) piperidine-1-oxide To a solution of 2 g. of sodium hydroxide in 100 ml. of ethanol was added 10 g. of 2,2,6-trimethyl-6-isobutyl-4-oxopiperidine-1-oxide and then 6.6 g. of benzyl cyanide and the resulting mixture was stirred at room temperature for 3 days. After completion of the reaction, the ethanol was distilled off under reduced pressure and the residue was dissolved in benzene. The benzene solution thus obtained was washed with water, dried over anhydrous sodium sulfate and the solvent was distilled off. The viscous residue was allowed to stand with cooling and thus crystallized. The crystalline substance thus obtained was then recrystallized from methanol to give the desired product, melting at 105–107° C.

Similarly, there were obtained the following piperidine-N-oxides:

2,2,6,6-tetramethyl-4-(α-cyano-α-carbamoylmethylene) piperidine-1-oxide; and
2,2,6,6-tetramethyl-4-(α-ethoxycarbonyl-α-benzoylmethylene)piperidine-1-oxide.

EXAMPLE 5

Preparation of 2,2,6,6-tetramethyl-4-(α-carbamoylbenzylidene)piperidine-1-oxide (a) To a solution of 15.5 g. of 2,2,6,6-tetramethyl-4-piperidone and 12.3 g. of benzyl cyanide in 100 ml. of ethanol was added dropwise at 25–30° C. a solution of 5 g. of sodium hydroxide in 10 ml. of water. After completion of the dropwise addition, the reaction mixture was heated to 60–70° C. with stirring for 5 hours. After removal of the solvent by distillation, the residue was taken up with cold water and then the resulting mixture was allowed to stand. The crystalline substance which precipitated out was recovered by filtration, washed with water and recrystallized from aqueous ethanol to give 2,2,6,6 - tetramethyl - 4 - (α - cyanobenzylidene)piperidine, melting at 128–129° C.

(b) To a solution of 2.5 g. of the 2,2,6,6-tetramethyl-4-(α-cyanobenzylidene)piperidine obtained as described above in 30 ml. of methanol was added dropwise with stirring at room temperature a solution of 0.04 g. of ethylenediaminetetraacetic acid and 0.03 g. of sodium tungstate in 3 ml. of water and then 5 ml. of 30% aqueous hydrogen peroxide. The resulting mixture was stirred at room temperature for 5 hours and then heated to 60–65° C. for additional 8 hours. Then, the solvent was distilled off and the residue was taken up with aqueous potassium carbonate. The crystalline substance precipitated out in situ and the whole mixture was extracted several times with benzene. The combined extracts were washed with water and the benzene was distilled off. The crystalline substance thus obtained was then recrystallized from methanol to give the desired product, melting at 161–162° C.

7

*Analysis.*—Calculated for $C_{17}H_{23}O_2N_2$ (percent): C, 71.05; H, 8.07; N, 9.75. Found (percent): C, 70.90; H, 8.23; N, 9.98.

EXAMPLE 6

Preparation of 2,2,6,6-tetramethyl-4-(α-carbamoyl-α-ethoxycarbonylmethylene)piperidine-1-oxide (a) To a solution of 15 g. of 2,2,6,6-tetramethyl-4-piperidone and 11 g. of ethyl cyanoacetate in 70 ml. of ethanol was added 5 ml. of 30% aqueous sodium hydroxide at 10–15° C. with stirring. The resulting mixture was stirred for 8 hours, while the temperature being gradually raised to room temperature, and then the stirring was continued for additional 5 days at room temperature. The solvent was distilled off under reduced pressure and the residue was dissolved in benzene. The benzene solution was washed with water, dried and subjected to distillation under reduced pressure to give 2,2,6,6-tetramethyl - 4 - (α - cyano - α - ethoxycarbonylmethylene) piperidine, boiling at 131–134° C./2. mm. Hg.

(b) To a solution of 10.2 g. of 2,2,6,6-tetramethyl-4 - (α - cyano - α - ethoxycarbonylmethylene)piperidine in 30 ml. of methanol was added dropwise a solution of 0.1 g. of ethylenediaminetetraacetic acid and 0.08 g. of sodium tungstate in 5 ml. of water and then 19.3 ml. of 30% aqueous hydrogen peroxide. The resulting mixture was stirred at room temperature for 24 hours. The solvent was distilled off under reduced pressure, the residue was taken up with 5 ml. of water and the mixture was saturated with potassium carbonate with stirring. The crystalline substance thus precipitated was recovered by filtration, washed with water and recrystallized from benzene to give the desired product, melting at 155–156° C.

*Analysis.*—Calculated for $C_{14}H_{23}O_4N_2$ (percent): C, 59.38; H, 8.18; N, 9.89. Found (percent): C, 59.16; H, 7.97; N, 9.69.

EXAMPLE 7

Preparation of 2,2,6,6-tetramethyl-4-(α,α-dicarbamoyl-methylene)piperidine-1-oxide (a) To a solution of 15 g. of 2,2,6,6-tetramethyl-4-piperidone in 70 ml. of 3% aqueous sodium carbonate was added 6.5 g. of malononitrile with stirring at 10–15° C. The resulting mixture was stirred at room temperature for 3 hours. The crystalline substance which precipitated out was recovered by filtration, washed with water and then recrystallized from aqueous methanol to give 2,2,6,6 - tetramethyl - 4 - (α, α - dicyanomethylene) piperidine, as white crystals melting at 12–123° C.

*Analysis.*—Calculated for $C_{12}H_{17}N_3$ (percent): C, 70.90; H, 8.43; N, 20.69. Found (percent): C, 70.79; H, 8.44; N, 20.56.

(b) To a solution of 5 g. of the 2,2,6,6-tetramethyl-4-(α,α-dicyanomethylene)piperidine obtained as described above, 0.2 g. of ethylene diaminetetraacetic acid and 0.15 g. of sodium tungstate in 30 ml. of methanol was added 10 ml. of 30% aqueous hydrogen peroxide at 15–20° C. with stirring. The resulting mixture was stirred for 5 hours while the temperature being gradually raised to room temperature, and then the stirring was continued for additional 5 days at room temperature. The solvent was distilled off under reduced pressure, the residue was taken up with water and the mixture was saturated with potassium carbonate. The mixture was stirred at room temperature for 3 hours. The crystalline substance which precipitated out was recovered by filtration and recrystallized from aqueous methanol to give the desired product, melting at 216–217° C.

*Analysis.*—Calculated for $C_{12}H_{20}O_3N_3$ (percent): C, 56.67; H, 7.93; N, 16.53. Found (percent): C, 56.56; H, 7.98; N, 16.44.

Similarly, there were obtained the following piperidine-N-oxides:

2,2,6,6-tetramethyl-4-(α-ethoxycarbonyl-α-benzoyl-methylene)piperidine-1-oxide; and
2,2,6-trimethyl-6-isobutyl-4-(α-carbamoylbenzylidene) piperidine-1-oxide.

What is claimed is:
1. A compound having the formula

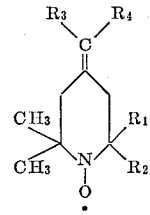

wherein $R_1$ and $R_2$, which may be the same or different, are alkyl of 1–8 carbon atoms and $R_3$ and $R_4$, which may be the same or different, are cyano, carboxyl, alkoxycarbonyl of 2 to 4 carbon atoms, carbamoyl, alkanoyl of 2 to 4 carbon atoms, benzoyl, naphthoyl, phenyl or naphthyl group.

2. 2,2,6,6-tetramethyl - 4 - (α-cyanobenzylidene)piperidine-1-oxide.

3. 2,2,6,6-tetramethyl - 4 - (α,α - dicyanomethylene) piperidine-1-oxide.

4. 2,2,6,6-tetramethyl - 4 - (α-cyano-α-ethoxycarbonyl-methylene)piperidine-1-oxide.

5. 2,2,6-trimethyl-6-isobutyl-4-(α - cyanobenzylidene) piperidine-1-oxide.

6. 2,2,6,6-tetramethyl - 4 - (α-carbamoylbenzylidene) piperidine-1-oxide.

7. 2,2,6,6-tetramethyl - 4 - (α-carbamoyl - α - ethoxy-carbonylmethylene)piperidine-1-oxide.

8. 2,2,6,6-tetramethyl-4-(α,α - dicarbamoylmethylene) piperidine-1-oxide.

References Cited

Cram et al., Organic Chemistry 2nd Ed., McGraw-Hill Book Co., New York, (1964), p. 313.

Rozantsev et al., Izv. Akad. Nauk SSSR, Ser. Khim. 1965 (2), 391–3.

Rozantsev et al., Izv. Akad. Nauk SSSR, Ser. Khim. 1965 (2), 393–4.

HENRY R. JILES, Primary Examiner

G. T. TODD, Assistant Examiner

U.S. Cl. X.R.

260—294, 294.3, 294.7